April 21, 1953

E. M. DELORAINE 2,636,113

FIXED ROUTE VEHICULAR LOCATION AND COMMUNICATING SYSTEM

Filed March 9, 1946

INVENTOR.
EDMOND M. DELORAINE
BY
ATTORNEY

April 21, 1953   E. M. DELORAINE   2,636,113
FIXED ROUTE VEHICULAR LOCATION AND COMMUNICATING SYSTEM
Filed March 9, 1946   6 Sheets-Sheet 2

INVENTOR.
EDMOND M. DELORAINE
BY
R P Morris
ATTORNEY

April 21, 1953   E. M. DELORAINE   2,636,113
FIXED ROUTE VEHICULAR LOCATION AND COMMUNICATING SYSTEM
Filed March 9, 1946   6 Sheets-Sheet 3

INVENTOR.
EDMOND M. DELORAINE
BY
*R P Morris*
ATTORNEY

April 21, 1953      E. M. DELORAINE      2,636,113
FIXED ROUTE VEHICULAR LOCATION AND COMMUNICATING SYSTEM
Filed March 9, 1946      6 Sheets-Sheet 4

INVENTOR.
EDMOND M. DELORAINE
BY
ATTORNEY

E. M. DELORAINE

2,636,113

FIXED ROUTE VEHICULAR LOCATION AND COMMUNICATING SYSTEM

Filed March 9, 1946

INVENTOR.
EDMOND M. DELORAINE

BY

*R P Morris*
ATTORNEY

Patented Apr. 21, 1953

2,636,113

UNITED STATES PATENT OFFICE 2,636,113

FIXED ROUTE VEHICULAR LOCATION AND COMMUNICATING SYSTEM

Edmond M. Deloraine, Paris, France, assignor to Federal Telephone and Radio Corporation, New York, N. Y., a corporation of Delaware Application March 9, 1946, Serial No. 653,268

14 Claims. (Cl. 246—8)

1

This invention relates to a system for locating and communicating with vehicles following a fixed route such as cars and trains on a track. More particularly it deals with a wired wireless system for conveying high frequency radio and/or quasi-radar signals to vehicles along a fixed route and is related to other inventive features of the combination disclosed in the copending application of Paul R. Adams, filed February 27, 1946, bearing Serial No. 650,703, and entitled "Radio Echo Pulse System for Vehicles Following a Fixed Route," assigned to the same assignee as the present invention. The Adams application discloses and claims a broad safety warning system in which transmitted pulses are caused to be reflected in accordance with fixed obstacles along the route, such as crossings, curves, tunnels or other track conditions which should be known to the operator of the vehicle, and are indicated to the operator in the vehicle.

This application discloses a method whereby a special pulse reflecting object is located on a vehicle in radiation-coupled proximity with the transmission line which runs parallel to the vehicular route, and which object will give an indication at a remote point along the route to show the location of the vehicle upon which said reflecting object is located.

It is an object of this invention to locate and communicate with vehicles along a fixed route in a novel and effective manner.

It is another object to signal the operator of a vehicle along a fixed route in a novel and effective manner so as to give him more information than he could obtain by other previously employed signaling systems.

Another object is to provide means for keeping the operators of vehicles in continuous contact with the dispatcher of the vehicles.

Another object is to communicate continuously and/or simultaneously between two vehicles along a given route, between vehicles and a ground station, and between two ends or portions of the same vehicle such as a train.

Another object is continuously and simultaneously to provide multichannel telephone, telegraph and/or facsimile communication to and from vehicles along the fixed route, including telephones in Pullman cars so that passengers on the train will not be isolated from the outside world.

Another object is to provide continuously communication for trains and other vehicles along a fixed route which is unaffected by tunnels, bridges, curves, mountains, high tension wires, or the like.

Another object is continuously and/or simultaneously to indicate the location of any or all objects along a given fixed route including the location of curves, crossings, bridges, tunnels, switches, other vehicles, and other objects across the route including land slides and the like, as well as to indicate the speed and direction of other vehicles along the route both ahead and behind any given vehicle along the route.

Another object is to indicate and/or control the speed of vehicles along a fixed route either visually and/or automatically according to the location of objects ahead and behind that vehicle as well as according to the speed, weight, length, weather conditions, or the like, which influence the distance within which the vehicle may safely be slowed down and/or stopped. Such objects which affect the speed of vehicles may include curves, tunnels, bridges, and crossings or the like which require speeds below a certain amount for passage thence along with safety.

Another object is to identify different objects along the route as well as their location including different vehicles, curves, tunnels, bridges, different ends of a given vehicle or train, or other information which may be valuable to the operator of a vehicle along a given fixed route.

Another object is to provide electronic responsive means such as "electronic lanterns" which provide a passive resonance for radar signals, which means may be hung on vehicles or other objects along the route for producing a given reflecting signal or a given shaped echo pulse which may be identified.

Another object is to provide means for producing a delay of radar pulses transmitted along the route which may be employed for producing caution and danger signals to vehicles passing along the route and/or automatically control the speed of such vehicles.

Still other objects will appear from time to time in the description which follows:

Generally speaking, the system of this invention for locating and communicating with vehicles along the fixed route comprises: (1) a radiating means or transmission line, extending along the fixed route, and (2) a radio transmitter-receiver coupled to the radiating transmission line, and (3) means on the vehicles, at stations and/or at danger or caution sections at points along the route which are inductively or radiation-coupled to the transmission line for affecting the flow of energy in said line sufficiently to be detected at another point along the route. This system may be divided into two main portions (a) a communication system for telephone, telegraph and/or facsimile signals and (b) a quasi-radar location indicating system.

The communication and radar location systems preferably are each at least two-way signaling systems, that is, a different frequency carrier wave is provided for the signals traveling in each direction and preferably a different frequency carrier wave may be provided for each system. Additional frequency carrier waves may be provided if three-way radar is employed and/or if a two-way radar system is employed at each end of the fixed route. Thus, a location and communication system employing a two-way multichannel communication system, a two-way radar location system from one terminal and a three-way radar location from the other terminal may require seven different carrier wave frequencies. However, one three-way radar system can give the same information as a two-way radar system at each end terminal, therefore, both types of radar systems are not necessary. The three-way radar system has the advantage over two-way radar systems of only requiring three separate carrier frequency waves instead of four, and therefore requires less equipment.

It is desirable that the signals in the multichannel communication system be pulse modulated and interleaved on a multichannel pulse train. These pulses may be frequency, amplitude or time modulated, and preferably the latter as more specifically disclosed in my joint copending application filed September 29, 1943, and bearing Serial No. 504,204 (now abandoned), and in U. S. Patent No. 2,429,613, or in U. S. Patents Nos. 2,547,001, 2,474,244, 2,424,977, 2,498,678, and others. The synchronizing pulses employed in such a system may differ from the signal modulated pulses, by being of different shape as of greater width or may comprise a pair of closely spaced pulses of the type disclosed in the U. S. Patent No. 2,485,591. A cathode ray device may also be employed in modulation and demodulation systems as disclosed in the U. S. Patents Nos. 2,429,631 and 2,465,380. If desired one or more of the pulse modulated channels of audio frequency may be subdivided into a plurality of telegraphic channels, such as described in the U. S. Patent No. 2,549,826.

If the signal modulated pulses are composed of high frequency components at a video or higher frequency say of about 1–10 megacycles it is not necessary that the pulses be modulated on a radio frequency carrier wave since they may be directly transmitted over the radiating transmission line along the route. If their frequency is below video frequency it is desirable that the pulses be modulated on a radio frequency of say up to about 5,000 kilocycles. The frequencies of the pulses on the carrier waves of the incoming and outgoing signals may or may not be in synchronism.

The quasi-radar location indicating system may comprise a radar pulse generator which transmits pulses of a given frequency in one direction along the wave which pulses may be reflected back to the nearest one of a plurality of repeater stations at spaced intervals (described later) along the route and then converted on to a carrier of another frequency which carries signals passing in the opposite direction, namely the echo pulses. The received echo pulses may then, together with the transmitted radar pulse, be transmitted on as a whole as a third carrier frequency, thus establishing a three-way radar system so that receivers along the route tuned to the third carrier frequency may indicate the location of all the objects along the route. Such a system indicates objects both in front and behind any vehicle along the route.

Instead of the three-way radar system a two-way radar system may be provided at each terminal employing four carrier frequency waves, two in each direction, which will also indicate to any vehicle the position of objects both in front and behind it. Two-way radar in each direction is particularly advantageous for vehicles traveling in both directions along the route. If this is the case, either three-way radar or two-way radar systems should be employed. The carrier waves for the radar signals should be modulated on a high frequency radio carrier wave.

The radiating means or transmission line which follows the route should preferably be mounted as closely as possible to the vehicles along the route, the closer the better. This line may comprise a pair of matched wire conductors held an even distance apart by a suitable dielectric medium. These wires may be very close together, but slight errors in spacing are magnified when this is the case. Therefore, it is desirable that they be spaced at at least about one inch apart and should be molded in a suitable dielectric which will keep them at a constant spacing. In the case of a railway system, these wires may be placed parallel to the rails and preferably as close to the wheels of the cars or other metal objects on the cars as practicable, so that these metal objects may set up a natural impedance in the line to produce a reflecting or echo pulse.

Any change in the design or shape of radiating means such as may occur in a switch or at a crossing where the means may be buried under the route, track or rails, produces echo pulses along the line. However, if proper shielding and joining of the radiating means to a wire cable is carefully made, no echo pulses will be produced. Such shielding and joining is well-known by those skilled in the art of conduction of U. H. F. and micro waves. On the other hand, production of such a reflection or echo pulse may be desired to indicate the location of that switch, crossing, or the like.

If the cable is along the ground and/or close to one of the rails along a railway track, it may be desired to half shield the cable with a metal coating so that it will only be affected by metal in the rail or other objects adjacent the ground.

Instead of employing the metal parts of the vehicle for producing reflections or echo pulses, devices or metal objects of specific design may be placed on the vehicles to cooperate with the cable causing passive reflections of the radar pulses in the cable. If desired a high frequency resonator or "electronic lantern" may be hung on the vehicles close to the radiating means, which resonator will change the shape of the pulse to identify certain objects upon which the "electronic lantern" is hung. These "electronic lanterns" may be made of different sizes or shapes to produce different shaped echo pulses.

A third type of radar reflecting device for a vehicle may be of the active type such as a radio transmitter and receiver which may also employ means for identifying the vehicle as well as transmitting other signals over the re-transmitted or echo pulses.

The radar pulses may be transmitted from the vehicle themselves, or may be passed through it from one or more ground stations coupled to the radiating means.

To maintain a relatively constant amplitude signal in the transmission line or cable along the route, repeater stations are placed at suitable intervals, say every mile or so, along the line to amplify the signals transmitted over the cable. To prevent amplification of the carrier frequency waves in the wrong direction, the repeater stations are provided with suitable filters to separate the different directive carrier waves, before they are amplified. These repeaters may also include simple receivers and transmitters for each of the separate carrier wave frequency transmitted over the cable. The power for operating these repeater units may be transmitted directly over one or more of the wires of the cable, or may be supplied from any local source, or from a power line laid especially for that purpose, or from storage batteries in each station, or the like. It is desirable that the power employed by the amplifiers and/or transmitters and receivers in these repeater stations be not much more than about one watt. These stations preferably are automatic and unattended.

Also along the route may be provided signal stations inductively or radiation-coupled to the radiating transmission line or cable which may produce different types of signals for controlling or warning vehicles of obstacles such as curves, tunnels, bridges, or the like along the route. These signal stations may, similarly to repeater stations, be self-contained and unattended and may comprise simple transmitters and receivers with means for identifying or changing the signals received so that they may be identified when they are re-transmitted over the cable.

The location system includes an indicating device, such as a cathode ray tube having a screen upon which the reflected pulses may be indicated along a calibrated scale for visually showing the relative distance between objects along the route. The different reflected pulses may have identifying characteristics such as shape or width or may blink off and on slowly according to different code signals. Furthermore, these reflected pulses may be monitored in a cathode ray device or in suitable gating tubes to indicate the nearness of objects, which indications may be automatically coupled to operation of the vehicle for slowing it down and/or stopping it, if the reflected pulses occur too close to the relative position of that vehicle.

The reflected pulses may be visually followed along the screen of a cathode ray tube to indicate the relative direction and speed of the objects producing them, or any one or more of these pulses may be automatically selected and followed for indicating the absolute and/or relative speed of these objects along the route, to the operator of a vehicle or to the dispatcher at a ground station.

These and other objects and features of the invention will become more apparent upon consideration of the following detailed description of an embodiment of the invention to be read in connection with the accompanying drawings in which.

Figure 6:
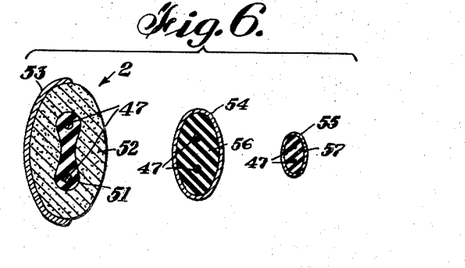
Fig. 6 shows a plurality of sections of cables shown in Figs. 5 and 7 and having similar impedances.
Figure 7:
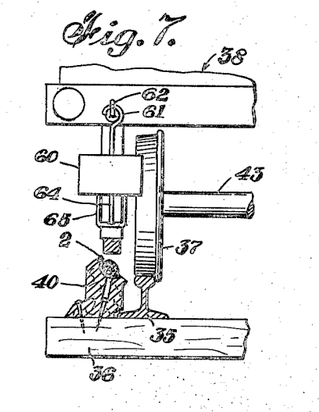
Fig. 7 is a view similar to Fig. 5 showing in part the end of a railway car with an "electronic lantern" hanging thereon.
Figure 8:
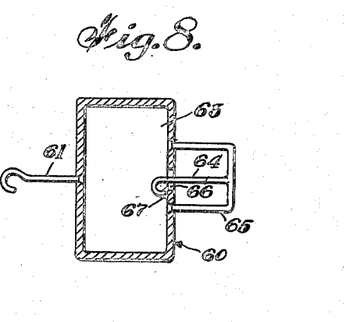
Fig. 8 is a cross-sectional view of an "electronic lantern" of the type shown in Fig. 7.

For purposes of illustration the system of this invention will be described in connection with a railroad communication and location system such as the type schematically shown in Fig. 1. In describing this system the description will be divided into the following chapters:

Chapter I.—The track and radiating means—
   (a) Repeater stations (illustrated in Figs. 1, 2, 3)
   (b) Signal stations for active radar reflections (illustrated in Fig. 4)
   (c) The cable and objects causing natural radar reflections (illustrated in Figs. 5 and 6)
   (d) Passive radar reflection devices (illustrated in Figs. 7 and 8)

Figure 9:
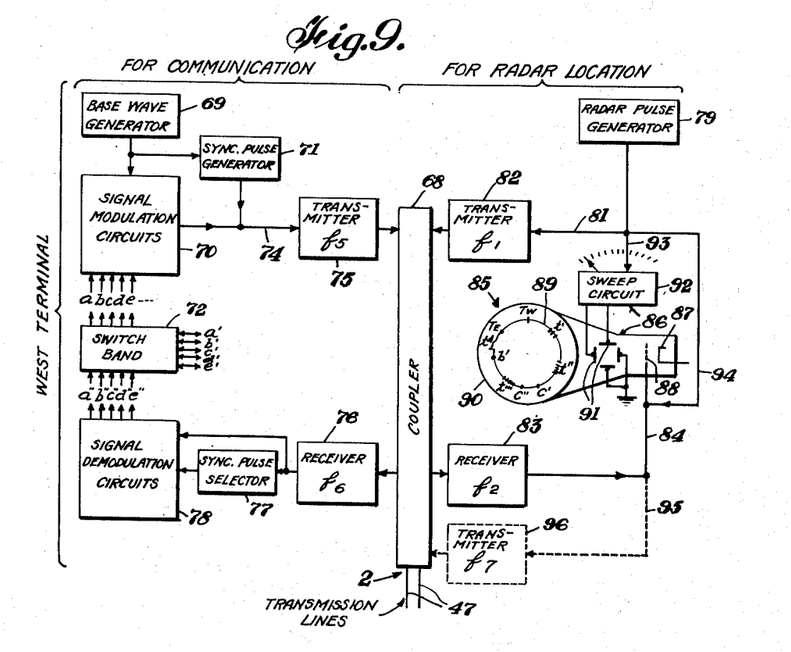
Fig. 9 is a schematic block wiring diagram of a main or the West terminal circuit shown in Fig. 1.
Figure 10:
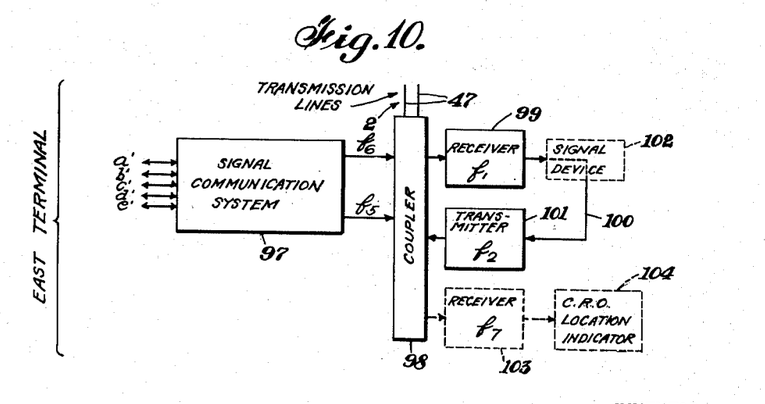
Fig. 10 is a schematic block wiring diagram of the East terminal circuit shown in Fig. 1.

Chapter II.—The west or main terminal circuits (illustrated in Fig. 9)—
   (a) Communication system
   (b) Radar location system Chapter III.—The east terminal circuits (illustrated in Fig. 10).

Chapter IV.—The train circuits (illustrated in Figs. 12–16)—
   (a) Communication system (illustrated in Fig. 12)
   (b) Radar location system (illustrated in Figs. 12–16)
      1. Train identifying circuit (illustrated in Fig. 12)
      2. Position indicator circuit (illustrated in Fig. 12)
      3. Speed control devices (illustrated in Figs. 12 and 13)
      4. Two- and three-way radar (illustrated in Fig. 12)
      5. Speed indicator device (illustrated in Figs. 15 and 16)

CHAPTER I

The Track and Radiating Means

Figures 1, 2, 3:
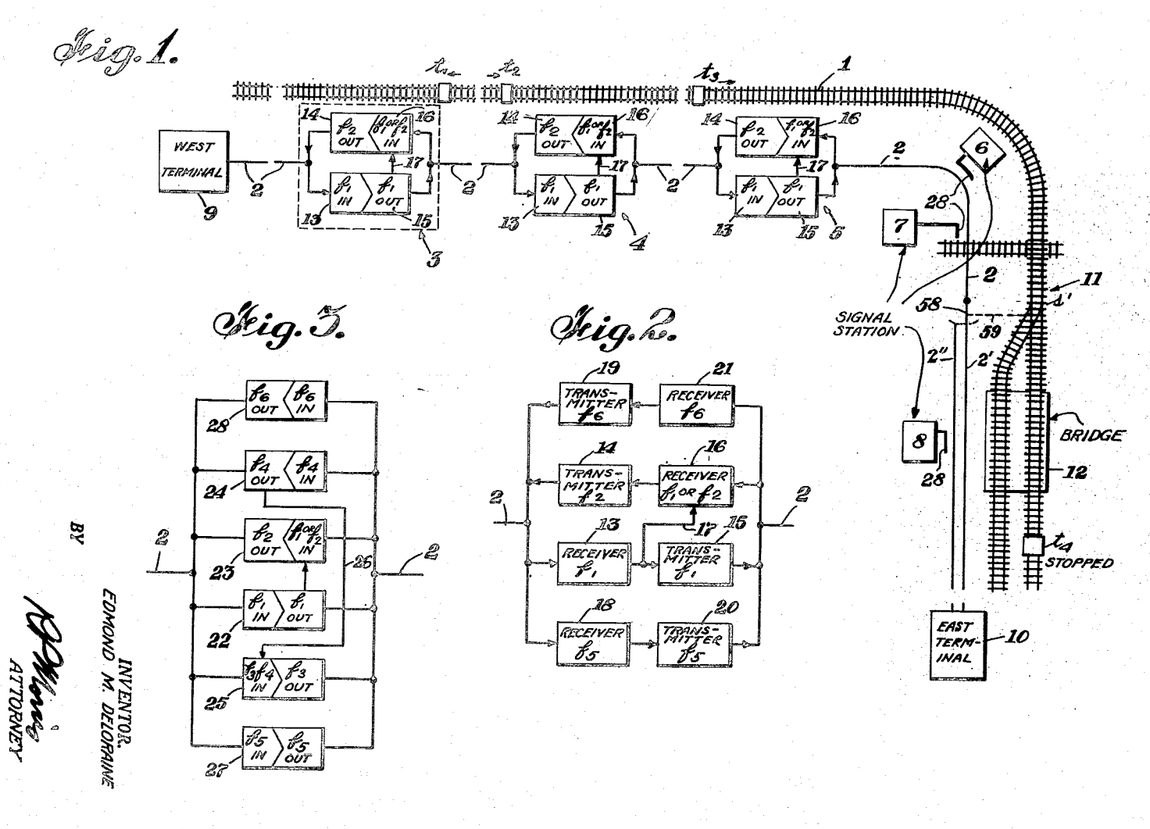
Fig. 1 is a schematic diagram of different portions of a fixed route with a radiating transmission line having repeater stations therealong.
Fig. 2 is a schematic block wiring diagram of a repeater station having a two-way radar and a two-way signal communication transmitter and receiver.
Fig. 3 is a schematic block wiring diagram of a repeater station having two two-way radar circuits and a two-way signal communication circuit.

Referring to Fig. 1 there are shown sections of a railroad track 1 having thereon cars or trains $t^1$, $t^2$, $t^3$, $t^4$ stopped or traveling in the directions shown by the arrows. Along the track is provided a radiating transmission line 2 having at spaced intervals therealong repeater stations 3, 4, and 5 and signal stations 6, 7, and 8. At each end of the cable there is provided a terminal; a main or West terminal 9 and an East terminal 10. The track is shown to curve opposite station 6, to have a crossing adjacent signal station 7, to contain a switch 11, and cross a bridge 12 adjacent station 8.

As the trains pass along the track 1 they pick up signals carried on different frequency carrier waves which for convenience will be indicated as follows: waves of frequencies $f_1$ and $f_2$ for radar and echo pulses transmitted and received, respectively, from and to the West terminal 9; waves of frequencies $f_4$ and $f_3$ for radar and echo pulses which are transmitted and received, respectively, from the East terminal 10; waves of frequencies $f_5$ and $f_6$ for signal communication carrier waves from and to the West terminal 9, respectively; and wave of frequency $f_7$ which may be used in connection with waves of frequencies $f_1$ and $f_2$ or $f_3$ and $f_4$ for a three-way radar communication system.

For simplicity there is only shown in the repeater stations 3, 4 and 5 means for separating and amplifying waves of frequencies $f_1$ and $f_2$. However, more elaborate repeater stations are shown in Figs. 2 and 3 which will be described later.

I(a) Repeater stations

Referring specifically to the stations 3, 4, 5 there are provided a filter means 13 for receiving the wave of frequency $f_1$ from the West terminal 9 and separating it from the wave of frequency of $f_2$ amplified and/or transmitted from the circuit 14. The filter means 13 then passes the wave $f_1$ to an amplifying circuit 15 for increasing the strength of the signals in wave $f_1$ and transmitting them on through cable 2 toward the East terminal. If there is a train or other object which reflects the radar pulses on wave $f_1$ located, say between repeater stations 4 and 5 namely train $t^3$, reflected echo pulses of a frequency $f_1$ as well as the pulses from the amplifier circuit 14 in repeater station 5 will pass into the receiver 16. Since the frequency of a radar pulse is not changed by reflection, receiver 16 must have a sufficiently wide receiving band to receive waves of both frequencies $f_1$ and $f_2$ and convert and amplify all the pulses received in circuit 14 onto the carrier wave of frequency $f_2$. Thus, once a reflected or echo pulse has been received in one of the repeater stations 3, 4 or 5 it will from then on be amplified and transmitted over a wave of frequency $f_2$ back along the cable 2 to the West terminal 9. If two or more reflecting obstacles are positioned at different points along the route each one will produce a reflection which will be repeated back, as above described.

The presence of two or more reflecting obstacles will not result in any continued back and forth reflections or singing, because with each reflection the echo becomes weaker and the sensitivity of the receiver therefore may be designed so as not to be responsive to reflections as weak or weaker than a double echo. This also is the case if two or more objects causing reflections occur between two adjacent repeaters such as trains $t^1$ and $t^2$ between repeaters 3 and 4.

To prevent reflections from the repeaters themselves the impedances of the circuits 13, 14 are balanced with that of their adjacent connecting line 2, as is the impedance in the circuits 15 and 16 with its adjacent connecting line 2. Singing within the repeaters 3, 4 and 5, due to the amplification in 15 of frequency $f_1$, is prevented by blocking the receivers 16 by means of lines 17 during the time that the amplifiers or transmitters 15 are operating.

In Fig. 2 there is disclosed a repeater comprising filters and amplifiers 13, 14, 15 and 16 with blocking line 17 as shown in Fig. 1, wherein the filters and amplifiers are disclosed as radio transmitters and receivers. Also in Fig. 2 is shown the radio transmitters and receivers 18, 19, 20 and 21 for the signal communication waves of frequencies $f_5$ and $f_6$. The outgoing carrier wave $f_5$ from the West terminal 9 passes through the receiver 18 and is then amplified and transmitted in transmitter 20 back onto the cable 2, and similarly the incoming carrier wave of frequency $f_6$ toward the West terminal 9 (and from East terminal 10) is received in receiver 21 and amplified and transmitted in transmitter 19. Since reflected or echo pulses are much lower in energy than the original pulses these receivers for carrier waves $f_5$ and $f_6$ may be constructed so as to be sensitive only to the main pulses and ignore all reflections and weaker pulses which may occur from objects along the route.

If two two-way radar location systems are provided, one from each terminal, a repeater circuit such as that shown in Fig. 3 may be employed. In this figure the radar pulses from the West terminal 9 are sent out over carrier wave $f_1$ and transmitted back over carrier wave $f_2$ through the circuits 22 and 23 corresponding to those of repeater 3, 4 or 5 shown in Fig. 1. The radar pulses transmitted over frequency wave $f_4$ and reflected back over frequency wave $f_3$ from the East terminal 10 (or traveling in the opposite direction of that wave from terminal 9) are transmitted and returned through the circuits 24 and 25, respectively; the receiver being blocked through line 26 while the transmitter is transmitting. The signal communication carrier waves of frequencies $f_5$ and $f_6$ are transmitted in each direction in the circuits 27 and 28, similar to the transmitters and receivers 18 through 21 shown in Fig. 2. If a three-way radar system is employed a single receiver and transmitter circuit for the third wave carrier frequency $f_7$ may be substituted for the circuits 24 and 25 shown in Fig. 3.

I(b) Signal stations for active radar reflections

In order to signal a train of curves, crossings, bridges, switches and the like which occur along the route and do not in themselves produce natural radar reflecting or echo pulses, separate signal stations may be provided which are inductively- or radiation-coupled to the radiating transmission line or cable 2. These stations may receive and transmit and/or re-shape the received pulses to notify the operators of vehicles of their location, or to produce pulses which will automatically control the speed or operation of the vehicle, as will be described later. Three of these signal stations are shown in Fig. 1 at 6, 7 and 8 which produce corresponding pulses $c'$, $c''$ and $b'$ (see Fig. 11).

If desired a signal station may be placed at each switch such as switch 11 along the track and may comprise means for transmitting a signal in response to a received signal to indicate whether the switch is opened or closed and/or to slow down the train, to open or close any desired switches ahead or behind the train or other service as desired.

Each signal station may be provided with an antenna 28 (see Fig. 4) which is inductively or radiation-coupled to the cable 2 so that it may receive pulses without causing a natural reflection or echo pulse in the line 2.

Figure 4:
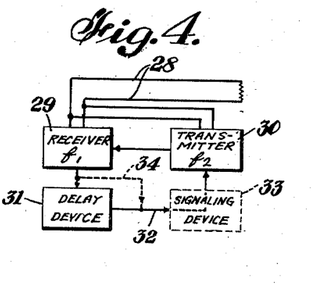
Fig. 4 is a schematic block wiring diagram of a signal station which may be placed along the route shown in Fig. 1.

The antenna 28 may comprise a pair of lines which are both connected to a receiver 29 and a transmitter 30. Since the receiver 29 is desired to be responsive to radar pulses, it is tuned to the frequency $f_1$ and/or $f_4$ to receive only the radar pulses. These received radar pulses may be delayed in delay device 31 an amount sufficiently to correspond to an object any desired distance ahead of the approaching vehicle and then may be passed through line 32 to the transmitter 30, and back onto the line 2 on wave $f_2$. Thus, the operator of the vehicle will see that an object is a certain distance ahead of him and will slow down the vehicle accordingly, or the vehicle may be automatically controlled thereby. Further description of the operation of the vehicle in response to such a delayed pulse will be described later.

There also may be provided in the circuit of stations 6, 7 or 8 a signaling device 33 inserted in the line 32 for re-shaping the delayed pulse or causing it to flicker according to a signal code so as to identify that particular station.

The signal station may only comprise a receiver 29, transmitter 30 and a signaling device 33, namely to identify the position of the station and not to produce a false delay for control of the speed of an approaching vehicle. In this case, the received pulse from the receiver 29 is passed directly through line 34 into the signal device 33 and thence to the transmitter 30.

I(c) *The cable and objects causing natural radar reflections*

Figure 5:
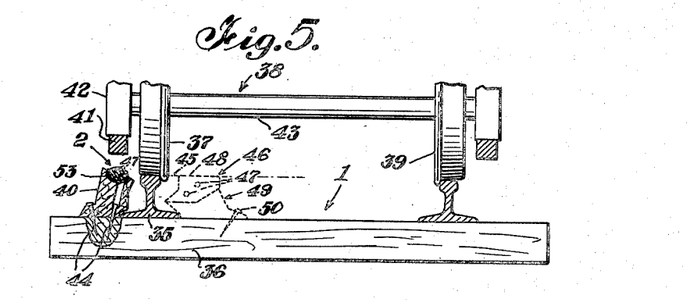
Fig. 5 is a vertical cross-section of a railway track, railway car, and the radiating transmission line of this invention therealong.

In Fig. 5 there is shown a cross-section of the railway track 1 having a steel rail 35 mounted on a tie 36 on which roll steel wheels 37 and 39 of a railway car 38. Along the rail 35 is shown a support or wooden molding 40 for supporting the cable 2 as close as possible to metal portions of the car 38, namely the wheel 37 and supports 41 suspended from the bearing 42 on axle 43. The molding 40 may be made of wood and spiked to the tie 36 by means of spikes 44.

At grade crossings the cable 2 may be re-shaped and positioned at level 45 along the inside of the rail 35 as shown in dotted lines at 46. In this embodiment the pair of wires 47 comprising the radiating transmission line may be embedded in a suitable dielectric block 48 made of hard rubber or the like, supported upon a suitable molding 49 spiked by means 50 to the tie 36. The dielectric block 48 may be provided with a flat top which will not be damaged by objects passing across the track 35. The embodiment 46 may be provided the full length of the track, however, it is believed that molding 40 with the cable 2 shown outside the rail 35 would be of more economical design for most places.

If desired, the two or more cables may be provided, one on each side of the track, or one on each side of one rail, wherein one carries signals for trains traveling in one direction and the other carries signals for trains traveling in the opposite direction, or one cable may carry signals for trains on two parallel tracks traveling in the same or opposite directions.

The section of cable 2 shown in Fig. 5 is more clearly shown in Fig. 6 wherein the metal wires 47 comprising the radiating transmission lines are embedded in a suitable strong dielectric 51 which maintains the spacing between wires 47 comparatively constant. It is not necessary that the dielectric 51 be of greater volume than about that shown, since it may be further surrounded by a comparatively less expensive dielectric material 52. This dielectric 52 will protect the cable and give it sufficient size and strength so that it may easily be mounted and laid along the track 35, as well as serve to minimize impedance irregularities in the wires 47 caused by snow, ice and sleet by keeping such undesired elements at least three-quarter of an inch or more away from the wires 47. The dielectric 52 may be made of saw dust and a suitable plastic non-conductive material, molded together to form the cable 2.

The cable 2 may be half-shielded by means of a half metal coating 53 outside the dielectric 52 which is adjacent to the support 40. This metal coating prevents the pulses in the lines 47 from being affected by a metal of the rail 35, or the spikes 44, or other objects which are not along the track or on the rails 35. This half-shield tends to increase the sensitivity of the cable 2 so it will be affected only by the metal of the wheels 37 and/or the suspending portions 41 of the car 38, or other objects adjacent thereto.

In the case of a grade crossing between the two railway tracks, the cable cannot be placed over the crossing rails and therefore it must be buried under the crossing track or otherwise removed from its proximity to the rail 35. It is well-known in high frequency techniques that such a cable may be gradually changed in shape and size as shown in other views of Fig. 6 and may be provided with a complete metallic shield 54 or 55 surrounding a dielectric medium 56 or 57 without causing reflection or echo pulses. Thus the outside dimensions of the cable may be decreased, the size and spacing of the wires 47 also may be decreased correspondingly as shown in Fig. 6 to prevent such reflections. This change in size of the cable must be gradual and once it is completely shielded as shown at 54 or 55 it may be buried under the ground.

In the case of a switch, such as that shown in 11 in Fig. 1, the cable 2 may be increased in size, similarly, so that the wires 47 at 58 in Fig. 1 may be mechanically constructed and moved to contact either of the adjacent ends of the two cables 2' or 2" when the switch 11 is moved by a suitable connecting means 59. The design of such a switch to prevent reflections is clearly within the knowledge of those skilled in the art of high frequency technique. However, it may be desired that such a switch produces a reflection of a given type and in this case a mere sudden change in the shape or spacing of lines 47 will produce such a reflection, thereby producing an echo pulse indication of the location of the switch.

I(d) *Passive radar reflections devices*

Instead of the natural reflections caused by metallic portions of the vehicles on a track as described in Chapter I(c) above and shown in Fig. 5, a passive type of reflecting device such as an "electronic lantern" 60 shown in Figs. 7 and 8 may be employed. This lantern may be hung by a suitable support 61 on a hook 62 at the rear end of the railroad car 38 shown in Fig. 7. This hook may be the same or similar to that used for lighted lanterns today which are hung on the rear end of trains or parked railroad cars along the track. This lantern 60 may comprise a hollow resonating chamber or shell 63 made of an electrically conductive material (such as a casting) having a hole 66 therein from which is projected a conductive wire or rod 64 welded to the inside surface of said shell. This conductor 64 may be held in place by a suitable bracket 65.

Figure 11:
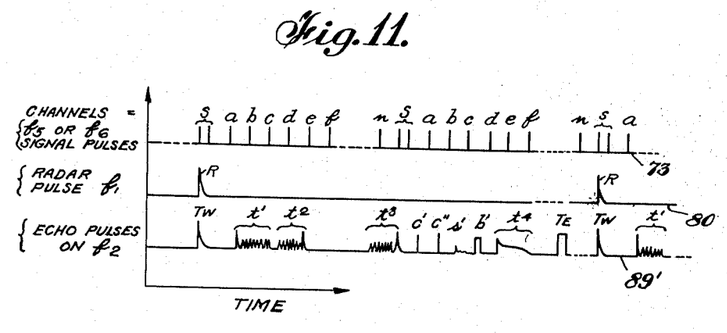
Fig. 11 is a graph of wave forms useful in explaining the operation of the circuits shown in Figs. 9, 10 and 12.

Any radar pulses occurring along the line 2 will thus be picked-up by the metal portions and/or conductor 64 of the lantern 60 and conducted into the resonant chamber 63 wherein oscillations are set-up and a reflected pulse of greater duration, similar to that shown in the $t^4$ in Fig. 11, is produced from a sharp radar pulse of the type R, also shown in Fig. 11. If desired, lanterns of different shapes and sizes may be provided to identify different objects upon which they are hung. These lanterns are obviously easily constructed since they may be made from a simple metal casting having a hole 66 therein through which the wire 64 is passed and welded at 67. One advantage of this type of lantern over a lighted lantern is that it need not be provided with a source of visible light, and may be much more simple, more rugged, and more cheaply constructed.

CHAPTER II

THE WEST OR MAIN TERMINAL CIRCUITS

A schematic diagram of the communication and radar location circuits in the West or main terminal 9 is shown in Fig. 9, in which the signal communication circuits are shown on the left and the radar location circuits are shown on the right of the common coupler means 68 to couple the respective transmitters and receivers of said circuits to the wires 47 of the cable 2.

II(a) Communication system

In the communication circuit there may be provided a base wave generator 69 which is connected to a plurality of signal modulating circuits 70 and a synchronizing pulse generator 71. Separate signal channels $a, b, c, d, e, \ldots n$ may be connected directly to the modulating circuits 70 or may be passed through a suitable switchboard 72 which is connected to other channels $a', b', c'$, etc., from the outside sources, and/or to received signal channels $a'', b'', c''$, etc. The signal modulation circuits are preferably of the type for producing time modulated trains of pulses according to different signals which may be telegraphic, audio, video or combination of two or more thereof. The resulting produced trains of time modulated signals may be then interleaved with each other and the synchronizing pulses from the generator 71 to produce a pulse wave similar to wave 73 shown in Fig. 11. This wave 73 may be passed through line 74 to transmitter 75 wherein it is modulated onto a carrier wave having a frequency $f_6$ before being passed through the coupler 68 to the radiating means or cable 2. In Fig. 11 the synchronizing pulses S are shown to be a pair of pulses, although they may possess other shape characteristics to distinguish them from the time modulated pulses of channels $a, b, c, d \ldots n$.

The received signal modulated pulses on frequency $f_6$ may be received in receiver 76 from which is withdrawn a multichannel pulse train also similar to that shown at 73 in Fig. 11. This received wave may be passed to a synchronizing pulse selector circuit 77 for removing the synchronizing pulses such as that shown in the above mentioned U. S. Patent No. 2,485,591.

The received wave from receiver 76 is also passed through a line directly to the demodulation circuits 78 in which the separate trains of time modulated pulses corresponding to each signal channel are separated and demodulated and may then be withdrawn as channels $a'', b''$, etc., and also may be connected through the switchboard 72.

The modulation and demodulation circuits 70 and 78 may be similar to those mentioned in the above cited copending applications disclosing multi-channel time modulation pulses.

II(b) Radar location system

The radar location system may comprise a radar pulse generator 79 for producing a series of pulses R, as shown on wave 80 in Fig. 11, which pulses should have a frequency of at least about thirty times a second in order that they may produce a continuously visible spot of light on the fluorescent screen of a cathode ray tube or similar indicating devices. These pulses R are then passed through line 81 to a transmitter 82 for modulation on a carrier wave having a frequency $f_1$.

The reflected or echo pulses which are transmitted back over the line 2 on a carrier wave having a frequency $f_2$ are received in the receiver 83 and passed through line 84 to a suitable position indicator 85, such as a cathode ray device.

This position indicator 85 may comprise a cathode ray tube 86 having an electron gun 87 for producing a beam of electrons which are cut-off-and-on or varied in intensity by the grid 88 connected to line 84. The beam may be caused to produce a circular trace 89 on a screen 90 by the potential on the plates 91 from the sweep circuit 92 controlled by the radar pulses R from generator 79 through line 93. (The sweep circuit may be variable and if desired an additional or vernier cathode ray tube may be supplied for selecting any portion of the trace 89 and magnifying it on the screen of the vernier tube.) There are shown on the trace 89 spots Tw and Te which may correspond to the West and East terminals 8 and 9, respectively. The pulse R corresponding to the West terminal may be applied to the grid 88 from the generator 79 over line 94 to produce the spot Tw. The spots $t^1, t^2, t^3, t^4$, appear as a plurality of many short bright pulses corresponding to the trains of corresponding reference characters. The spots $c', c''$ and $b'$ correspond respectively to the signals from the signal station 6, 7 and 8, respectively. The elongated spots corresponding to the trains are due to the many reflections from the wheels of the cars making-up these trains. A clearer illustration of the type of pulses forming the spots along the trace 89 is shown by wave 89' in Fig. 11 in time delayed position relative to the original radar pulses R shown on wave 80.

If a three-way radar system is employed the pulses from the generator 79 in line 94 may also be passed through line 95 together with the received pulses from receiver 83 and modulated on a carrier wave of frequency $f_7$ in the transmitter 96 for re-transmission over the cable 2. As previously mentioned the advantage of a three-way radar enables trains to locate the position of objects both in front as well as behind them and/or may permit trains to travel in both directions along a given route at the same time with comparative safety.

CHAPTER III

THE EAST TERMINAL CIRCUITS

The East terminal 10 may comprise communication and radar location circuits similar to the West terminal 9. A schematic diagram of the East terminal circuits is shown in Fig. 10 wherein the signal communication system circuits, including all of those shown in Fig. 9 to the left of the coupler 68, are illustrated as a block 97. Into this block the $f_5$ and $f_6$ carrier frequency waves are introduced to and from a common coupler device 98 (similar to 68) which connects the receivers and transmitters of the East terminal to the lines 47 of cable 2.

If desired, the separated synchronizing pulses S received over frequency carrier wave $f_5$ may be employed for synchronizing the signals to be modulated and transmitted over the frequency carrier wave $f_6$, thereby eliminating in the circuits shown at 97 the necessity of the base wave generator such as 69. In this case the synchronizing pulse selector would be directly connected both to the signal demodulation and to the signal modulation circuits as well as to a synchronizing pulse generator. Further details of such a system may be found in the U. S. Patent No. 2,510,066.

The radar location system shown on the right side of a coupler 98 may comprise a $f_1$ carrier wave receiver 99 to receive the radar pulses of wave 80 (shown in Fig. 11), which pulses may be again coupled directly through line 100 to the transmitter 101 onto the carrier frequency wave $f_2$ and passed back onto the cable 2 to produce the bright spot $T_E$ shown on the trace 89 of the location indicator 85 (in Fig. 9) at the West terminal. If desired, however, a signal device 102, similar to that mentioned at 33 in Fig. 4, may be provided in the line 100 for shaping or impressing a characteristic signal on the pulse R before it is re-transmitted from the transmitter 101.

In a two-way radar system an additional radar transmitter and receiver circuit (not shown) similar to that shown in Fig. 9 for the West terminal 9 also should be coupled to the coupler 98. Similarly the West terminal should likewise contain a receiver and transmitter (not shown) for carrier waves $f_3$ and $f_4$, like receiver and transmitter 101 in Fig. 10. Such circuits however are not necessary if a three-way radar system is employed. In this latter case the re-transmitted location indicating pulses on carrier frequency wave $f_7$ are received in a suitable receiver 103 and then passed to a cathode ray location indicator 104, similar to 85 disclosed in Fig. 9. This cathode ray indicator circuit 104 would comprise means for separating the original radar pulses R from the other pulses on the wave and employ the separated radar pulses for controlling the sweep circuit of said cathode ray tube.

Also, if desired, a location indicating circuit (not shown) similar to that described in Fig. 9 may be connected to the coupler 98 for indicating at the East terminal as well as at the West terminal, the position of the trains and objects along the route.

CHAPTER IV

THE TRAIN CIRCUITS

Figure 12:
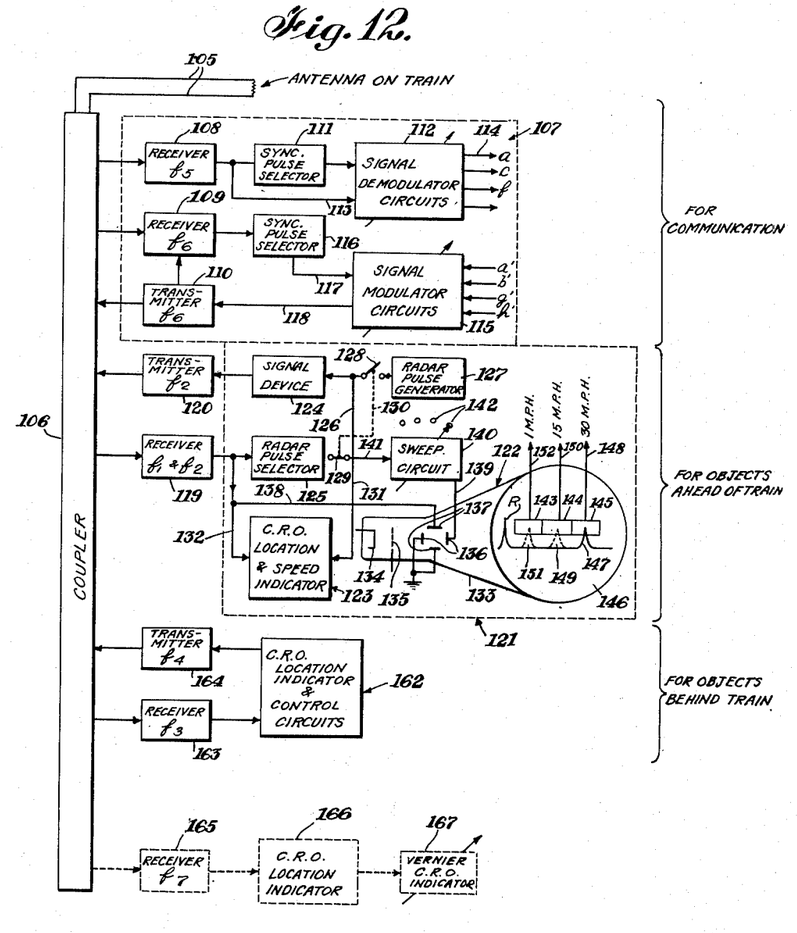
Fig. 12 is a block wiring diagram of an active transmitter and receiver circuit for a vehicle or train on the route or track shown in Fig. 1.

Any one or more of the cars traveling over the track 1 may be equipped with a radio receiver and transmitter system similar to that shown in the block diagram of Fig. 12. It is desirable, however, that each train have at least one such system and in case of freight or other long trains it may be desirable to have such a system at each end of the train.

The transmitter and receiver circuits on the train may be provided with an antenna 105 which should be suspended from the car as close to the cable 2 as practically possible, say within at least about one foot thereof. This antenna 105 may be any suitable type of radiating means and may be jointly coupled to the transmitters and receivers for the different carrier frequency waves by a suitable coupler 106, similar to couplers 68 and 98 above mentioned.

IV(a) Communication system

The train communication system 107 may be provided with separate receivers 108, 109 for both carrier frequency waves $f_5$ and $f_6$ and a transmitter 110 only for carrier wave $f_6$. The receiver 108 receives the pulse waves 73 and passes them through a synchronizing pulse selector circuit 111 (similar to circuit 77 in Fig. 9) from which is produced a demodulating base wave which is passed into the signal demodulator circuits 112 together with the received wave 73 over line 113. The signal demodulator circuits 112 may be similar to circuits 78 shown in Fig. 9 or may be provided with only a few channels and be adjustable for selecting one of the many received channels in accordance with the disclosure shown in the said U. S. Patent No. 2,510,066 above mentioned. The resulting received signals may then be withdrawn through suitable lines 114, which may be passed through a switchboard (not shown), if desired.

The signal modulation circuits 115 may be similar to circuits 78 and fed by separate signal channels $a'$, $b'$, $g'$, $h'$, which also may be connected through a switchboard (not shown). The different signal channels also may be provided only with a few channels and be adjustable for selecting and one or more of channel spaces along the multichannel wave $f_6$. In order to synchronize the transmission of these selected signal channels on the carrier wave $f_6$, the carrier wave $f_6$ is also received in receiver 109 and the synchronizing pulses S thereon are selected in circuit 116 for producing a wave which is used in synchronizing the circuits 115 through line 117. The resulting synchronizing time modulated pulse trains produced in circuits 115 are then passed into line 118 to transmitter 110 to be interleaved on the multichannel pulse wave 106 passing along in the cable 2.

It is desirable to keep at least one signal channel continuously connected to all of the trains and also to provide a signal channel from each of the trains to at least one of the terminals or ground stations to provide continuous uninterrupted communication between the dispatcher and the operators of the trains for reception and transmission of safety and operational messages enroute.

IV(b) Radar location system

Similarly as shown in the repeater stations, the location indicating system is provided with a receiver 119 for receiving pulses on both carrier frequency waves $f_1$ and $f_2$ and a transmitter 120 for transmitting only the echo pulse from the train on the carrier frequency wave $f_2$. The receiver 119 is constructed to receive both frequency carrier waves $f_1$ and $f_2$ so that it may receive echo pulses from objects along the track which are between it and the next repeater station ahead of the train as well as echo pulses from objects beyond said next repeaters. This receiver and transmitter are connected to the location indicator and control circuits 121 which may comprise a speed control device 122, a cathode ray location and/or speed indicator 123, and a signalling or train identifying circuit 124.

IV(b) 1. TRAIN IDENTIFYING CIRCUIT

The received echo and radar pulses may be first passed into a radar pulse selector 125 which separates the radar pulses from the echo pulses either by amplitude selection or by selection of the first pulse of the train of pulses corresponding to pulse Tw on wave 89' (and R on wave 80) in Fig. 11. The thus selected radar pulses may then be passed through line 126 to a signal device 124 wherein these pulses may be re-shaped and/or flickered according to a given code signal corresponding to the particular train. The resulting coded radar pulses are then passed to the transmitter 120 for modulation on the carrier frequency wave $f_2$ and transmission back along the cable 2 in the opposite direction of the received radar pulse on wave $f_1$.

If desired the radar pulses R may be initiated on the train from the radar pulse generator 127 and connected through switch 128 to the signal device 124, or may be directly connected to the transmitter 120 by a line not shown. In such a system it is not necessary to provide a radar pulse selector 125 since synchronization of the indicating and control devices 122 and 123 may be had through a direct connection to the generator 127. Thus, the operation of switch 128 may open switch 129 through suitable connecting means 130 for disconnecting selector 125.

IV(b) 2. POSITION INDICATOR CIRCUIT

The cathode ray location indicator device 123 may be identical with the indicator 85 previously described and disclosed in connection with Fig. 9. This indicator may be controlled by (1) the selected radar pulses through line 131 for operating the sweep circuit of the indicator, and (2) all the echo pulses received from receiver 119 which may be connected through line 132 either to the grid of a cathode ray tube or a pair of deflection plates as shown in the cathode ray tube control device 122 described below.

The speed indicator which may be inserted in this same circuit 123 in place of or together with the location indicator will be described later in section IV(b) 5 in connection with Figs. 15 and 16.

IV(b) 3. SPEED CONTROL DEVICES

Figure 13:
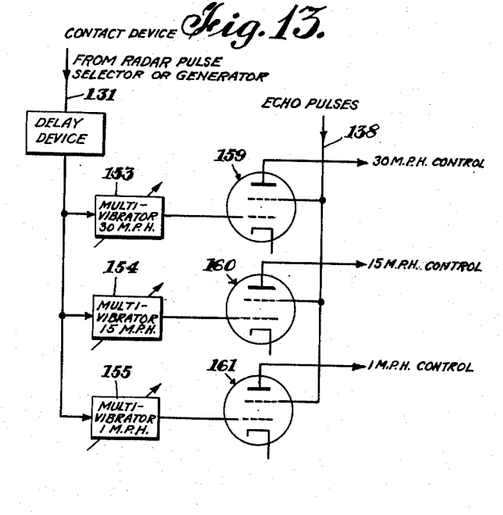
Fig. 13 is a schematic wiring diagram of a modification of the control circuit shown in Fig. 12.
Figure 14:
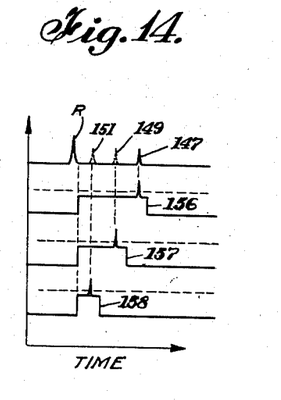
Fig. 14 is a graft of wave forms useful in describing the operation of the circuit of Fig. 13.

The speed control device 122 may be of several forms, two of which are disclosed: one a cathode ray speed indicator device 122, and the other an electronic gate circuit speed control indicating device of the type shown in Figs. 13 and 14.

The device 122 shown in Fig. 12 comprises a cathode ray tube 133 with an electron gun 134, grid 135, a pair of horizontal deflection plates 136, and a pair of vertical deflecting plates 137. The vertical deflecting plates 137 are directly connected over line 138 to the receiver 119 for producing pulses along the sweep line corresponding to the echo pulses received by the train. The horizontal deflecting plates 136 are connected through line 139 to a variable control sweep circuit 140 triggered by the selected radar pulses or the generated radar pulses from circuits 125 or 127, respectively, through line 141. The variable control sweep circuit 140 adjusts the spread of the beam and corresponding distance gaged in the tube, depending upon the rate of speed of the train, the weight of the train, the type of the train, the length of the train, and/or the local weather conditions. This adjustment may be made automatically, such as by connecting the control for the circuit 140 to a speed governor on the train (not shown), and/or separate contacts 142 may be provided corresponding to different weather conditions and/or different types of trains; or both. The reason for such adjustment will be described later.

The target end of the tube 133 is provided with a series of separate target plates 143, 144, 145 out of alignment with the initial radar pulse R, as shown on the screen 146 of the tube 133. On the screen 146 the radar pulse R is followed a given distance by an echo pulse 147 which contacts the target plate 145. This target may be connected to a circuit (not shown) through line 148 for indicating that an object is a certain distance away and that a certain speed, say 30 miles per hour, should be set as the maximum speed for the safety of the train. As the train approaches closer to the position of the object, the pulse 147 will move into the position 149 and contact the plate 144 which is connected to a circuit (not shown) through line 150 which will indicate that the maximum speed of the train should be, say, 15 miles per hour. Similarly, as the train aproaches still closer to the object the pulse will appear in the position 151 and contact the plate 143 which is connected through a circuit (not shown) through line 152 for indicating danger, stop, or a maximum speed of, say, about one mile per hour. If desired the lines 148, 150, 152 may be automatically connected to the throttle of the train to slow it down automatically instead of, or as well as, visually indicating the position of the object producing the pulses 147, 149, 151.

The adjustment for controlling the spread of the sweep circuit 140 thus will determine the effective distance at which the first reflected pulse will first contact the target plate 145. For example, if the train is a heavy freight train and the weather is icy it would take a much longer time to stop the train than if the train were light and the weather were dry. Accordingly, for the safest operation and control of such a train, a spread of the beam across the screen 146 corresponding to a distance, say, of several miles, should be employed by selecting a contact 142 which will produce such a spread.

Referring now to the gate control device shown in Fig. 13, which may be employed instead of the cathode ray device 122, the line 131 carrying the selected or generated radar pulses may be slightly delayed (about the amount of their duration) and then coupled to a series of multivibrators 153, 154 and 155 (corresponding to the targets 143, 144, 145) for producing rectangular pulses of different durations 156, 157 and 158, respectively, shown in Fig. 14. The received pulse wave containing all the echo pulses 147, 149, 151 (see the first wave in Fig. 14) is passed through line 138 onto one of the grids of each of the gate tubes 159, 160, 161. The alignment of the slightly delayed pulse R with the leading edges of the pulses 156, 157, 158 graphically shows how these pulses are produced in the multivibrator circuits 153, 154, 155, respectively. The outputs of these multivibrator circuits are respectively coupled to another grid in each of the gate tubes 159, 160, 161, so that when one of the reflected pulses 147, 149, or 151 superimposes upon the corresponding pulse 156, 157 or 158, the tube will become conductive and current will pass from the plate thereof to operate a circuit (not shown) for indicating and/or controlling the maximum safe speed of the train. For example, the plate of tube 159 is coupled to a control device for indicating the maximum speed of 30 miles per hour; the plate of tube 160 is connected to a control device for indicating maximum speed of 15 miles per hour; and the plate of tube 161 is connected to control device for indicating danger, stop, or a speed of one mile per hour.

The width or duration of the pulses 156, 157, 158 produced in the multivibrator 153, 154, 155 may be varied by varying the time constant circuits in these multivibrators in accordance with the type, weight, speed of the train, weather conditions, etc., similarly as the spread of the sweep circuit 140 was adjusted in the control device shown in Fig. 12.

IV(b) 4. TWO- AND THREE-WAY RADAR

Referring again to the circuit in Fig. 12, if a radar system is provided also at the other or East terminal for the convenience of trains traveling in the opposite direction or for indicating the position of objects behind a train, a circuit similar to 121 (just described) shown in block 162 may be coupled to a receiver 163 for receiving pulses on the carrier waves of frequencies $f_3$ and $f_4$, and may be coupled to a transmitter 164 for transmitting pulses on the carrier frequency wave $f_4$. This transmitter 164 and receiver 163 is likewise connected to coupler 106.

If a three-way radar system is employed, a separate receiver 165 for receiving carrier wave $f_7$ may be coupled to the coupler 106, and from it may be operated a cathode ray type location indicator 166, similar to 85 shown in Fig. 9 or similar to that provided in circuit 123 above mentioned. As previously referred to, this location indicator 166 may be coupled to a variable vernier location indicator 167 for magnifying the pulses from objects along any selected portion of the route disclosed on the screen of the indicator of circuit 166.

IV(b) 5. SPEED INDICATOR DEVICE

Figure 15:
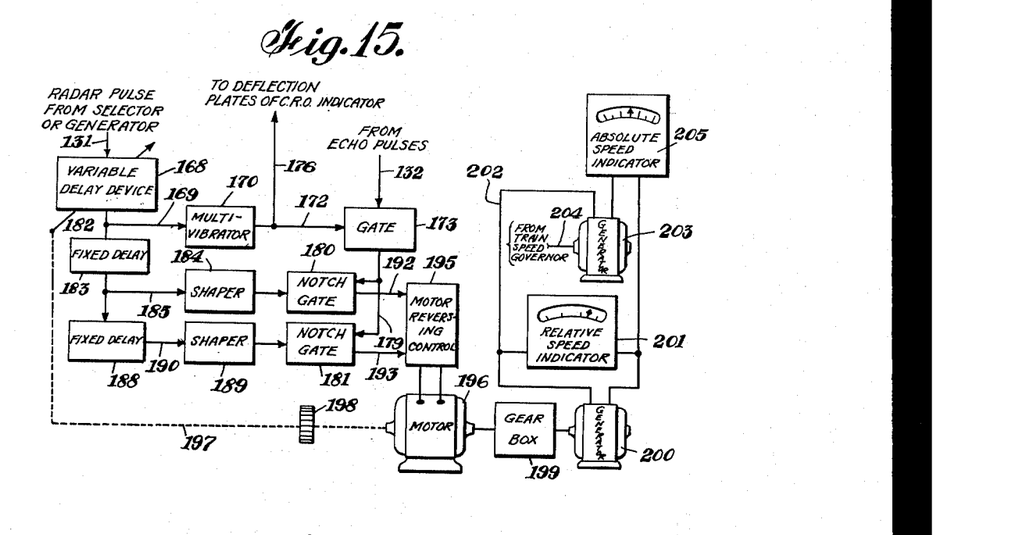
Fig. 15 is a schematic block wiring diagram of the speed indicator circuit shown in Fig. 12.

There may be coupled to the lines 131 and 132 in Fig. 12 a speed indicator device which may take a form similar to that shown in Fig. 15. Herein the selected or generated radar pulses in line 131 are passed through a variable delay device 168 to delay these pulses a time $x$, shown in the graph of Fig. 16. The resulting delayed radar pulses are then passed through line 169 to a multivibrator 170 for producing a delayed deblocking pulse 171 shown on the wave 175 in Fig. 16. This pulse is then passed through line 172 to the gate circuit 173 for controlling a gate for deblocking the desired echo pulse, say, $t^1$ occurring along the wave 174. (Wave 174 corresponds to wave 89' shown in Fig. 11, except that the train pulses $t^1$, $t^2$, etc., have been re-shaped and segregated from the other pulses on the wave 89' in a circuit not shown.) The position of the pulse 171 may be indicated on the cathode ray indicator in circuit 123 by connecting the wave 175 carrying pulse 171 thereto through line 176. The combination of the waves 174 and 175 in the gate circuit 173 produces wave 177 which is then clipped above level 178 so that only the desired selected radar pulse $t^1$ is passed through the line 179 into the notch gate circuits 180 and 181, described later.

Figure 16:
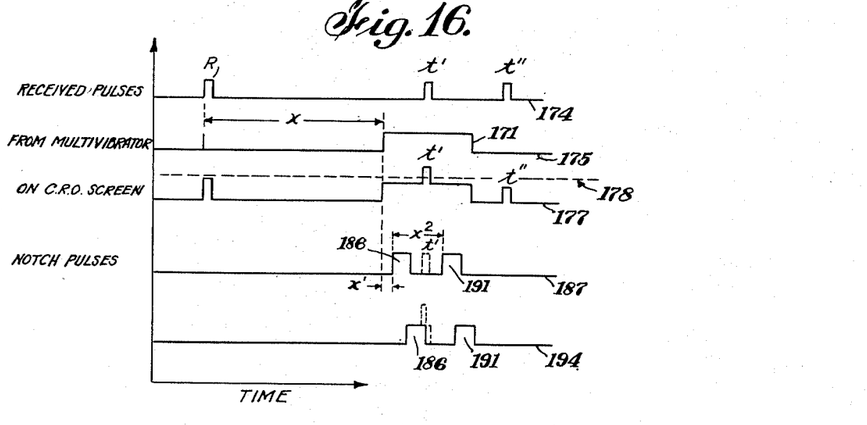
Fig. 16 is a graph of wave forms useful in explaining the operation of the circuit in Fig. 15.

The delayed pulse from the device 168 is also passed through line 182 into a fixed delay device 183 for delaying the pulses a distance $x^1$, shown in Fig. 16. The resulting further delayed pulse wave is passed into a shaper 184 through line 185 to produce the pulse 186, shown on wave 187 in Fig. 16. (This shaper 184 may also be a multivibrator similar to 170.) The resulting pulse 186 is then passed into the notch gate circuit 180.

The further delayed pulse from device 183 is also passed into a second and fixed delay device 188 to further delay the pulse a time $x^2$. The resulting further delayed pulse is passed to the pulse shaper 189 (similar to 184) through line 190 to produce the pulse 191 shown on wave 187. This pulse 191 is then passed into the second notch gate circuit 181. The notch gate circuits 180 and 181 are biased so that as long as the pulse $t^1$ is between the two pulses 186 and 191 (as shown on wave 187) no current will flow in either line 192 or 193. However, if the motion of the train $t^1$ relative to the train receiving the radar pulse R (on which this speed indicator device is located) is varied so as to change the distance between the pulse $t^1$ and R, the pulse $t^1$ will superimpose upon either pulse 186 or 191 (as shown in wave 194) and cause the corresponding gate to pass current to the motor reversing control circuit 195, to speed-up or slow down the operation of the motor 196 which is directly coupled to the variable delay device 168 through means 197. For example, if the echo pulse $t^1$ rides on pulse 186, the notch gate 180 will operate the control 195 to slow down the motor, and similarly if the pulse $t^1$ rides on the pulse 191, the notch gate 181 will cause the control 195 to speed up the motor 196. Thus, the motor 196 is controlled to keep the selected pulse $t^1$ in the notch between the two pulses 186 and 191, and the motor 196 will vary the delay device 168 corresponding to the relative change in the distance between the train receiving the pulse R shown in Fig. 16 and the selected echo pulse $t^1$. It is important that the delay $x^2$ is sufficient to produce a notch width wider than the width of the received or re-shaped echo pulse $t^1$.

The connection 197 may be provided with a manual adjustment 198 so that the delay device 168 may be adjusted at will to select any desired reflecting pulse on the wave 174 (or on wave 89' shown in Fig. 11).

The shaft of the motor 196 is connected also to a gear box 199 to speed up the rotation from the shaft so that it may drive a generator 200. The electricity generated in the generator 200 may then be run through a suitable voltmeter 201 which may have a scale calibrated in speed units to indicate the relative speed between the train on which this speed indicator mechanism is placed and the train selected by adjusting the deblocking pulse 171, namely train $t^1$.

If the absolute speed of the train $t^1$ is desired, the output from the generator 200 may be connected to the line 202 in series with a generator 203 operated by the speed of the train on which this mechanism is located (or from a speed generator not shown) over line 204. The algebraic sum of the outputs of these two generators 201 and 203 may then be measured in another voltmeter 205 which may have a scale calibrated in speed units to indicate the absolute speed of the selected train $t^1$.

While the above is a description of the principles of this invention in connection with specific apparatus and particular modifications thereof, it is to be clearly understood that this description is made only by way of example and not as a limitation on the scope of this invention as defined in the accompanying claims.

I claim:

1. A location indicating system for vehicles following a fixed route comprising: a radiating transmission line extending along said route, a radio transmitter-receiver coupled to said line including means for transmitting signal pulses on a carrier wave of one frequency, means for receiving echo pulses on a carrier wave of another frequency, means for transmitting all the received echo pulses as well as the transmitted signal pulses on a carrier wave of a third frequency, means on at least one of said vehicles radiation-coupled to said line to produce said echo pulses in response to said signal pulses, and means coupled to said line for receiving said third carrier frequency wave including means for indicating the position of said vehicles along said route.

2. The system of claim 1 wherein said means for receiving said third frequency carrier wave is mounted on one of said vehicles.

3. A location indicating system for vehicles following a fixed route comprising: a radiating transmission line extending along said route, a radio transmitter coupled to said line to apply signal pulses of a radiation frequency thereto, a radio receiver coupled to said line to receive echo pulses therefrom, means on at least one of said vehicles radiation coupled to said line for producing said echo pulses from the signal pulses and a vehicle speed-measuring device controlled by said receiver in accordance with the time relation between the signal pulses and the echo pulses.

4. A speed indicating device for continuously indicating the speed of any vehicle following a fixed route comprising: a radiating transmission line extending along said route, a radio transmitter coupled to said line to apply signal pulses of a radiation frequency thereto, a radio receiver coupled to said line to receive echo pulses therefrom, means on each of said vehicles radiation coupled to said line for producing said echo pulses from the signal pulses and means controlled by said receiver for automatically following any selected echo pulse including a motor and a connected generator circuit coupled to indicate the speed of the vehicle producing said selected echo pulse.

5. A signaling system for vehicles following a fixed route; comprising a radiating transmission line extending along said route, a pulse reflecting obstacle on any of said vehicles and located in radiation-coupled proximity to said line, a radio transmitter for applying signal pulses of a radiation frequency to said line, a radio receiver coupled to said line for receiving therefrom reflected pulses derived from reflection of the signal pulses by said obstacle, and location manifesting means connected to the receiver for operation according to the time relation between the signal pulses and the reflected pulses.

6. A signaling system between a pair of railroad units or the like relatively movable along a fixed route; comprising a radiating transmission line paralleling said route, a pulse impeding element on one of said units and located in radiation-coupled proximity to said line, a radio transmitter-receiver on the other of said units for transmitting signal pulses of a radiation frequency to said line and receiving therefrom reflected pulses deriving from the signal pulses encountering said impeding element, and location manifesting means coupled to said transmitter-receiver for operation according to the time relation between the signal pulses and the reflected pulses.

7. A signaling system between a pair of railroad units or the like relatively movable along a fixed route; comprising a radiating transmission line paralleling said route, a mass of electrically conductive material on one of said units and located within an inductive distance of said line, a radio transmitter-receiver for transmitting signal pulses of a radiation frequency to said line and receiving therefrom echo pulses deriving from the natural reflection of said signal pulses by said mass of conductive material, and location manifesting means controlled by the transmitter-receiver according to the signal pulses and the echo pulses.

8. A signaling system between a pair of railroad units or the like relatively movable along a fixed route; comprising a radiating transmission line paralleling said route, an electronic lantern located on one of said units within an inductive distance of said line and formed with a high frequency resonating chamber to produce on the line passive reflection pulses from signal pulses of a radiation frequency carried by said line, a transmitter-receiver on the other of said units for supplying the transmission line with said signal pulses and for receiving the effect of said reflection pulses, and location manifesting means controlled by the transmitter-receiver according to the time relation between the signal pulses and the reflection pulses.

9. The combination with a radiating transmission line and means for applying pulses of a high radiation frequency to said line, of an electronic lantern in inductive proximity to said line and formed with a high frequency resonating chamber distinctively shaped to produce on the line passive reflection pulses from the applied pulses on the line, said reflection pulses being distinctively shaped according to the shape of said chamber, and a radio receiver coupled to said line for producing an output pulse depending on the shape of the reflection pulse.

10. A signaling system between a pair of railroad units or the like relatively movable along a fixed route; comprising a radiating transmission line extending along said route, a plurality of repeaters at spaced intervals along said line, each repeater including means for amplifying and passing to the line signal pulses on a first, radiation frequency carrier wave and further including means for receiving pulses reflected at the same frequency from the signal pulses and converting the reflected pulses onto a carrier wave of a different frequency, a pulse reflecting obstacle on one of said units and located in radiation-coupled proximity to said line to produce the reflected pulses from the signal pulses, a transmitter-receiver on the other of said units for transmitting the signal pulses to the line and for receiving therefrom the reflected pulses on the carrier wave of said different frequency passed to the line through one or more of the repeaters intervening between said units, and location manifesting means controlled by the transmitter-receiver according to the time relation between the signal pulses and the reflected pulses.

11. A signaling system between a pair of railroad units or the like relatively movable along a fixed route; comprising a radiating transmission line extending along said route, a plurality of repeaters at spaced intervals along said line, each repeater including means for amplifying and passing on through the line signal pulses on a first, radiation frequency carrier wave and further including means for receiving pulses reflected at the same frequency from the signal pulses and converting the reflected pulses onto a carrier wave of a different frequency upon said line, a pulse reflecting obstacle located on one of said units in inductive proximity to said line for producing the reflected pulses from the signal pulses, and a transmitter-receiver on the other of said units including means for applying the signal pulses on the first frequency carrier wave to said line and means for receiving therefrom reflected pulses on carrier waves of both said frequencies, with the reflected pulses on the second mentioned carrier wave being received from the line through one or more of the repeaters when the units are relatively located along said route at a distance apart spanning one or more of the repeaters and with reflected pulses on the first carrier frequency wave being received from the line when the units are at relatively closer distances apart uninterrupted by a repeater.

12. A location indicating system for vehicles following a fixed route; comprising a radiating transmission line extending along said route and carrying signal pulses of a radiation frequency, line impeding signal pulse reflecting obstacles carried by said vehicles at inductive distance from said line, a transmitter-receiver coupled to said line to apply the signal pulses thereto and receive therefrom location pulses derived from reflections of the signal pulses by said obstacles, and means in the transmitter-receiver for comparing the respective times of the signal pulses and the location pulses to indicate the location of the vehicles along said route.

13. A location indicating system for a plurality of vehicles following a fixed route; comprising a radiating transmission line extending along said route, a radio transmitter coupled to the line for applying signal pulses thereto, means on each of said vehicles radiation coupled to the line for producing echo pulses from the signal pulses on the line, a radio receiver coupled to the line to receive the echo pulses, and a notch follow-up circuit connected to the receiver for following any selected received echo pulse.

14. The location indicating system of claim 13, said notch follow-up circuit comprising a motor synchronized with the motion of a given selected echo pulse and means connected to said motor for indicating the rate of change of position of said selected echo pulse.

EDMOND M. DELORAINE.

References Cited in the file of this patent

UNITED STATES PATENTS

| Number | Name | Date |
|---|---|---|
| 334,187 | Phelps | Jan. 12, 1886 |
| 800,653 | Kitsee | Oct. 3, 1905 |
| 887,357 | Stubblefield | May 12, 1908 |
| 1,453,387 | Espenschied et al. | May 1, 1923 |
| 1,556,633 | Ruben | Oct. 13, 1925 |
| 1,747,041 | Alexanderson | Feb. 11, 1930 |
| 1,808,022 | Del Prete | June 2, 1931 |
| 1,847,872 | Hand | Mar. 1, 1932 |
| 1,900,412 | Bossart | Mar. 7, 1933 |
| 1,985,241 | Daya | Dec. 25, 1934 |
| 2,034,026 | Curtis et al. | Mar. 17, 1936 |
| 2,034,034 | Green et al. | Mar. 17, 1936 |
| 2,161,292 | Hahnemann | June 6, 1939 |
| 2,201,472 | Browder et al. | May 21, 1940 |
| 2,214,924 | Griffiths et al. | Sept. 17, 1940 |
| 2,261,130 | Applegate | Nov. 4, 1941 |
| 2,363,416 | Henroteau | Nov. 21, 1944 |
| 2,379,818 | Mason | July 3, 1945 |
| 2,400,867 | Lindenblad | May 21, 1946 |
| 2,403,093 | Lear | July 2, 1946 |
| 2,414,266 | Lindenblad | Jan. 14, 1947 |
| 2,460,597 | Rodgers | Feb. 1, 1949 |
| 2,480,160 | Poylo | Aug. 30, 1949 |
| 2,510,066 | Busignies | June 6, 1950 |

FOREIGN PATENTS

| Number | Country | Date |
|---|---|---|
| 637,971 | France | Feb. 13, 1928 |